United States Patent

Peranto et al.

[11] Patent Number: 5,987,324
[45] Date of Patent: Nov. 16, 1999

[54] METHOD TO PREVENT CELLULAR PHONE FROM RECEIVING CONTROL CHANNEL OF WRONG SYSTEM

[75] Inventors: Juha Peranto, Halikko; Jukka Kyllonen, Marynummi, both of Finland

[73] Assignee: Nokia Mobile Phones Limited, Salo, Finland

[21] Appl. No.: 08/803,813

[22] Filed: Feb. 24, 1997

[51] Int. Cl.$^6$ .............................. H04Q 7/32; H04Q 7/36
[52] U.S. Cl. .................... 455/434; 455/432; 455/455; 455/459
[58] Field of Search ................................ 455/434, 432, 455/436, 455, 459

[56] References Cited

U.S. PATENT DOCUMENTS

| | | | |
|---|---|---|---|
| 4,750,198 | 6/1988 | Harper | 455/434 |
| 4,775,999 | 10/1988 | Williams | 455/435 |
| 5,255,307 | 10/1993 | Mizikovsky | 455/552 |
| 5,396,653 | 3/1995 | Kivari et al. | 455/88 |
| 5,408,684 | 4/1995 | Yunoki et al. | 455/434 |
| 5,430,740 | 7/1995 | Kivari et al. | 371/37.1 |
| 5,517,673 | 5/1996 | Fehnel | 455/434 |
| 5,577,024 | 11/1996 | Malkamaki et al. | 370/18 |
| 5,606,548 | 2/1997 | Vayrynen et al. | 370/252 |
| 5,732,353 | 3/1998 | Haartsen | 455/450 |

*Primary Examiner*—Dwayne D. Bost
*Assistant Examiner*—Alan T. Gantt
*Attorney, Agent, or Firm*—Perman & Green, LLP

[57] ABSTRACT

A method is disclosed for operating a mobile station (10) to obtain service from a cellular system, as is a mobile station that operates in accordance with the method. The method includes the steps of (a) scanning a set of dedicated control channels and tuning to the strongest dedicated control channel; (b) receiving a first control message (SPOM) from the dedicated control channel; (c) storing a first System Identification (SID) from the first SPOM; (d) determining if the channel number of the strongest dedicated control channel is equal to a system boundary channel number; and if yes, (e) tuning to a second strongest dedicated control channel; (f) receiving a second SPOM from the second strongest dedicated control channel and storing a second SID from the second SPOM; and (g) comparing the first SID to the second SID and if they are not equal, entering an IDLE task while remaining tuned to the second strongest dedicated control channel, else if the first SID is equal to the second SID, (h) re-tuning to the strongest dedicated control channel and entering the IDLE task while remaining tuned to the strongest dedicated control channel.

7 Claims, 4 Drawing Sheets

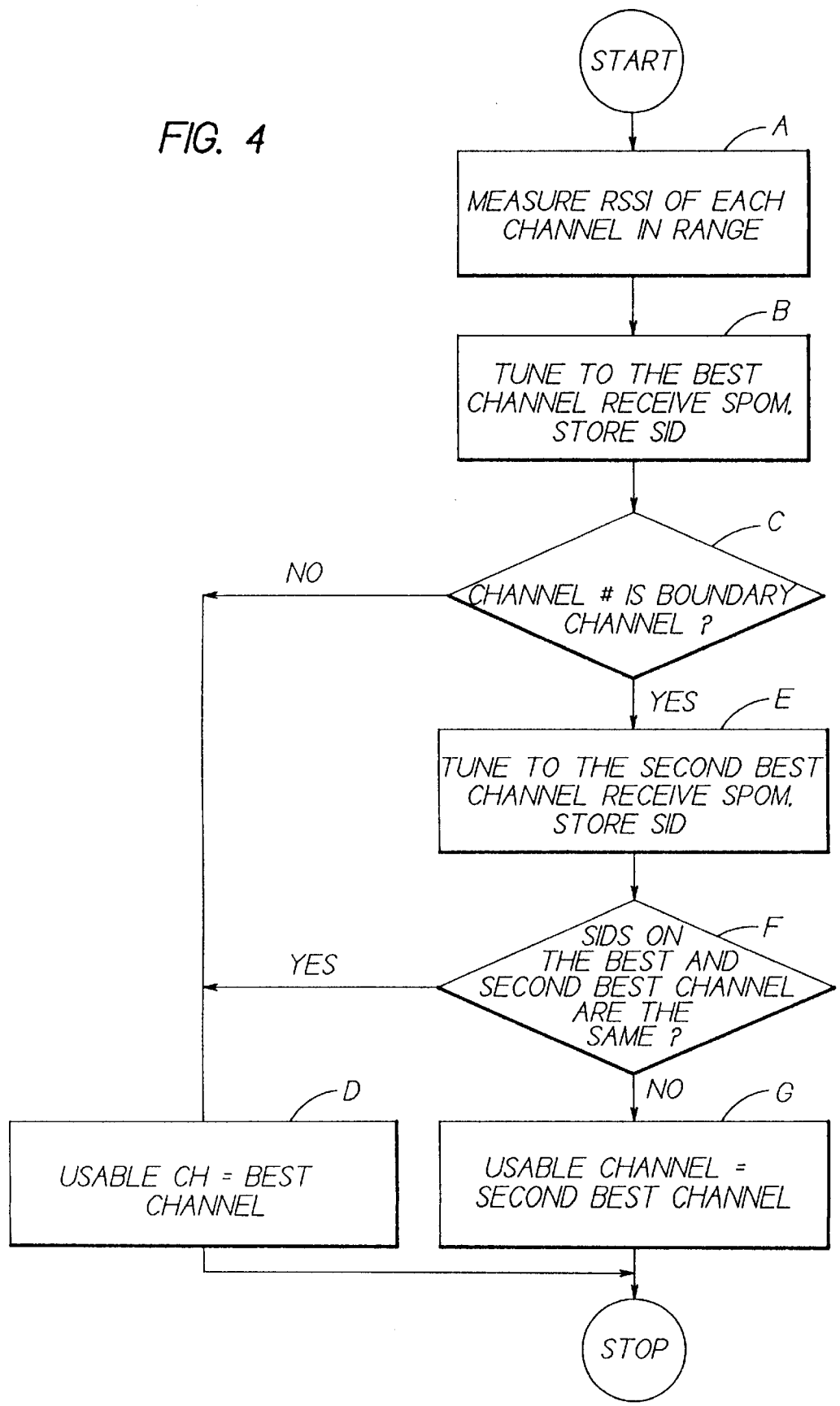

METHOD TO PREVENT CELLULAR PHONE FROM RECEIVING CONTROL CHANNEL OF WRONG SYSTEM

FIELD OF THE INVENTION

This invention relates generally to cellular telephones and, in particular, to mobile radiotelephones, also referred to herein as mobile stations, that employ control and paging channels to obtain service from a cellular system.

BACKGROUND OF THE INVENTION

In U.S. Pat. No. 5,020,091 there is described a cellular telephone communications system that includes multiple cells covering a geographical area, such as a metropolitan area. To the base station of each cell a number of frequencies are assigned, with some of the assigned frequencies being specified as control channels used for reciprocal identification between the telephones and the system. The location of the dedicated control channels in the cell's frequency spectrum identifies the type of cellular system, A or B (see, for example, EIA/TIA-553). A metropolitan area typically has one of each type of system.

In a cellular system of most interest to this invention the channel from a base station to the mobile station is referred to as the forward channel, i.e., the forward control channel and the forward voice channel. The channel from the mobile station to the base station is referred to as the reverse channel, i.e., the reverse control channel and the reverse voice channel.

The mobile station's transmitting channels are, by example, from 824.040 to 848.970 MHz and the receiving channels are, by example, from 869.040 MHz to 893.970 MHz. Further by example, the frequency 844.980 MHz is channel 666 for the mobile station's transmitter, and the frequency 889.980 MHz is channel 666 for the mobile station's receiver. When a system allocates a voice channel to the mobile station (e.g., channel 666), it allocates a frequency pair for receiving and transmitting. The frequency pair is referred to simply as channel 666. The receiving and transmitting frequencies of a given channel are always spaced apart by 45 MHz from one other.

Voice channels and access channels use both the forward and reverse channels. The system may have one or more forward control channels used for paging purposes only, and the mobile station is not allowed to transmit on the corresponding reverse channel (i.e., 45 MHz below the paging channel frequency). The forward paging channel is used only for receiving pages and orders from the base station.

However, in most cases the access channel set and the paging channel set are the same, and may comprise 21 channels (i.e., 42 frequencies). In this case the mobile station is allowed to transmit on the reverse control channels, while the corresponding forward control channels are used for paging and also for sending orders to the mobile station. In this case the orders can also include messages from the base station to the mobile station, which are related to system access, e.g. registration confirmation or initial voice channel designation (in the case of a page response).

In greater detail, and referring to FIG. 5A, there is shown an exemplary mobile station transmit (TX or reverse) frequency band and an exemplary mobile station receive (RX or forward) frequency band. The depiction of FIG. 5A is based on the EIA/TIA-553 frequency band allocation (mandatory). Each band is divided into 666 frequency channels, with half of the frequency channels being assigned to the A system and the remaining half to the B system. Although not illustrated in FIG. 5A, it should be realized that additional or extended frequency bands, also described in EIA/TIA-553, could also be allocated. The total width of the mandatory band is 20 MHz+20 MHz.

Each band includes a set of dedicated control channels (e.g., 21 control channels) for the A system, and a corresponding set of dedicated control channels for the B system. The dedicated control channels are used to send information to the mobile station so that it can proceed to the paging channel selection task. The dedicated control channel set is identical across North America (i.e., channels 334–354 for the B system and channels 333–313 for the A system).

In the illustrated case there is a 45 MHz separation between the TX and RX channels. That is, the TX channel number 1 is 45 MHz below the RX channel 1, the TX channel number 2 is 45 MHz below the RX channel 2, etc. As such, it is useful to think of frequency channel pairs, wherein a given mobile station, when assigned to a voice channel (e.g., channel 22), would receive from the base station at a frequency of n MHz, and would transmit to the base station at a frequency of (n-45) MHz. For the dedicated control channels, and by example, dedicated control channel 1 of the B system (i.e., channel 334) could be received by the mobile station from the base station at frequency n, and the mobile station may transmit to the base station at frequency (n-45) MHz.

In most if not all current systems each dedicated control channel is also a combined paging and access (P/A) channel, wherein paging messages and system access information are transmitted to the mobile station on a forward dedicated control channel, and wherein the mobile station transmits access requests (e.g., call origination messages) and other information to the base station on the corresponding reverse channel of the P/A channel pair.

The base stations frequently transmit an Overhead Message Train (OMT). The OMT includes a System Parameter Overhead Message (SPOM) that consists of two words. The SPOM always contains System Identification (SID) information. The SID is unique for each cellular system. The use of the SID enables the cellular phone to determine whether it is using its home system or whether it is roaming.

According to current standards (e.g., EIA/TIA-553), the SPOM is transmitted every 800±300 ms. The OMT may contain additional words, such as the REGID, which in some systems is sent in, by example, every tenth OMT.

As is depicted in FIG. 1, a typical cellular network is divided into a number of regions (e.g., SID1-SID5) each having contiguous radio cells (shown nominally as hexagons). One region or SID may also include one or more paging areas, each encompassing one or more radio cells.

Referring to FIG. 2, when the mobile station is powered on, or after a re-scan timer has expired, the mobile station enters a task where it scans the dedicated control channel set, determines the received signal strength indicator (RSSI) for each channel, and tunes to the strongest channel. The mobile station must receive a SPOM message within three seconds of tuning to the strongest control channel. If the mobile station is not able to complete this task, it either tunes to the second strongest channel, or it continues the channel selection process until the mobile station is able to lock onto one of the dedicated control channels.

Each cell site (or sector) usually has one control channel and several voice channels. Control channels and voice channels are selected according to the network frequency plan, but they include the channels 333 and 334 which, as is shown in FIG. 5B, are adjacent channels of different cellular systems (i.e., System A and System B).

A problem that is addressed by the teaching of this invention results from the use of a 10 kbits/second continuous data stream on the forward control channel. The spectrum of this signal is wider than the channel spacing (30 kHz), which means that some of the signal's energy appears also on adjacent channels (one channel above or below the channel). In the example of FIG. 5B, energy from channel 334 (System B) is shown as leaking into channel 333 (System A).

As was indicated above, when the cellular phone is powered on, performs a re-scan, or accesses the system, it first selects the serving system. If System A is selected, the cellular phone scans channels 333 . . . 313, measures the RSSI of each channel, and tunes to the best channel (strongest RSSI). The cellular phone must then receive message words within predetermined period of time before it can lock onto the channel and/or proceed to other tasks.

The problem arises when the cellular phone selects, by example, System A, and the cellular phone is located too near to a cell site which belongs to System B and which has the control channel of 334. Because of the presence of a large signal level on channel 334, the channel scan and RSSI measurement task can inadvertently determine that the adjacent channel 333 is the strongest control channel in the System A, when actually channel 331 (for example) is the strongest control channel. In this case the cellular phone may tune to channel 333 and then go to the Idle mode or task. The problem is that channel 333 is not a valid channel, at this location, for serving system A. Instead, the cellular phone is actually monitoring the "ghost" of the System B control channel 334. Since the cellular phone cannot normally receive any orders (page messages etc.) from the System B (assuming that System A is the phone's serving system), the cellular phone is essentially cut-off from service in its home system.

Problems also exist with call originations and terminations, since the cellular phone is normally not allowed to make calls in the System B when registered in System A (and vice-versa).

Another problem is that the cellular phone may illuminate its roaming indicator, even though the user expects that he or she is actually in the home system. A system selection feature, such as "A-only", is of no help, since the cellular phone remains tuned to the control channel set associated with the desired system.

OBJECTS OF THE INVENTION

It is a first object of this invention to provide an improved method for operating a mobile station to acquire service from a cellular system.

It is a second object of this invention to provide a method that eliminates a possibility that the mobile station may inadvertently tune to and monitor a control, paging or access channel from a second system that differs from the mobile station's home system.

SUMMARY OF THE INVENTION

The foregoing and other problems are overcome and the objects of the invention are realized by a method for operating a mobile station to obtain service from a cellular system, and a mobile station that operates in accordance with the method. The method includes the steps of (a) scanning a set of dedicated control channels and tuning to the strongest dedicated control channel; (b) receiving a first control message (SPOM) from the dedicated control channel; (c) storing a first System Identification (SID) from the first SPOM; (d) determining if the channel number of the strongest dedicated control channel is equal to a system boundary channel number (i.e., 333 or 334 for an EIA/TIA-553 compatible mobile station). If the determination is yes, the method includes the further steps of (e) tuning to a second strongest dedicated control channel; (f) receiving a second SPOM from the second strongest dedicated control channel and storing a second SID from the second SPOM; and (g) comparing the first SID to the second SID and if they are not equal, entering an IDLE task while remaining tuned to the second strongest dedicated control channel. If the first SID is found to be equal to the second SID, the method instead includes a step of (h) re-tuning to the strongest dedicated control channel and entering the IDLE task while remaining tuned to the strongest dedicated control channel.

More particularly, disclosed is a method for operating a mobile station to obtain service from a cellular system, comprising the steps of: (a) scanning frequency channels and tuning to a strongest channel, wherein the scanned frequency channels are at least one of a set of dedicated control channels, a set of paging channels, and a set of access channels; (b) receiving a message from the strongest channel and storing a first system identifier from the message; (c) determining if the channel number of the strongest channel is equal to a system boundary channel number; and if yes, (d) tuning to a second strongest channel; (e) receiving a further message from the second strongest channel and storing a second system identifier from the further message; and (f) comparing the first system identifier to the second system identifier and, if they are not equal, remaining tuned to the second strongest channel, else if they are equal retuning to the strongest channel.

BRIEF DESCRIPTION OF THE DRAWINGS

The above set forth and other features of the invention are made more apparent in the ensuing Detailed Description of the Invention when read in conjunction with the attached Drawings, wherein:

FIG. 4 logic flow diagram that illustrates a method of this invention for operating the mobile station of FIG. 3.

DETAILED DESCRIPTION OF THE INVENTION

Figure 1:
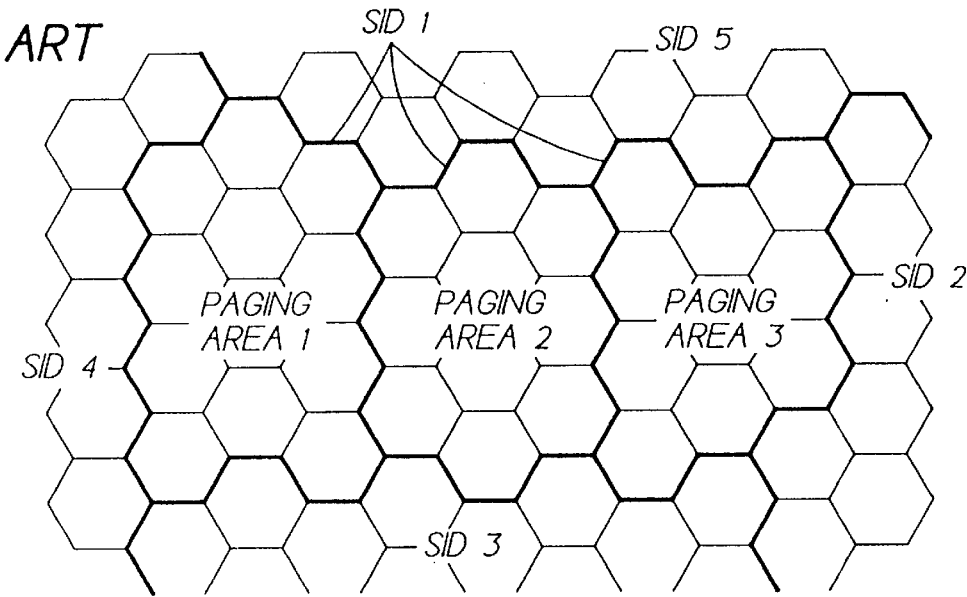
FIG. 1 illustrates a portion of a conventional cellular service area comprised of multiple SIDs, multiple paging areas within a SID, and multiple cells within a paging area.
Figure 3:
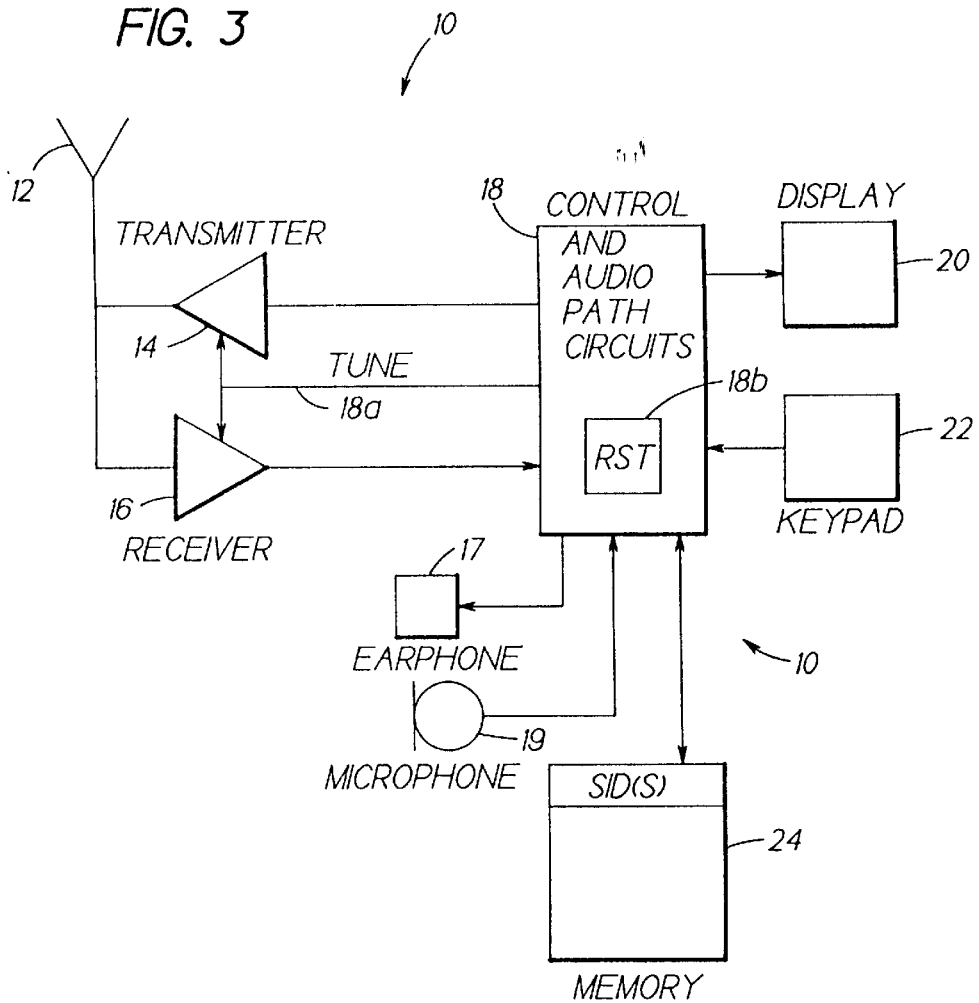
FIG. 3 is a block diagram of a mobile station that is constructed and operated in accordance with this invention.
Figure 2:
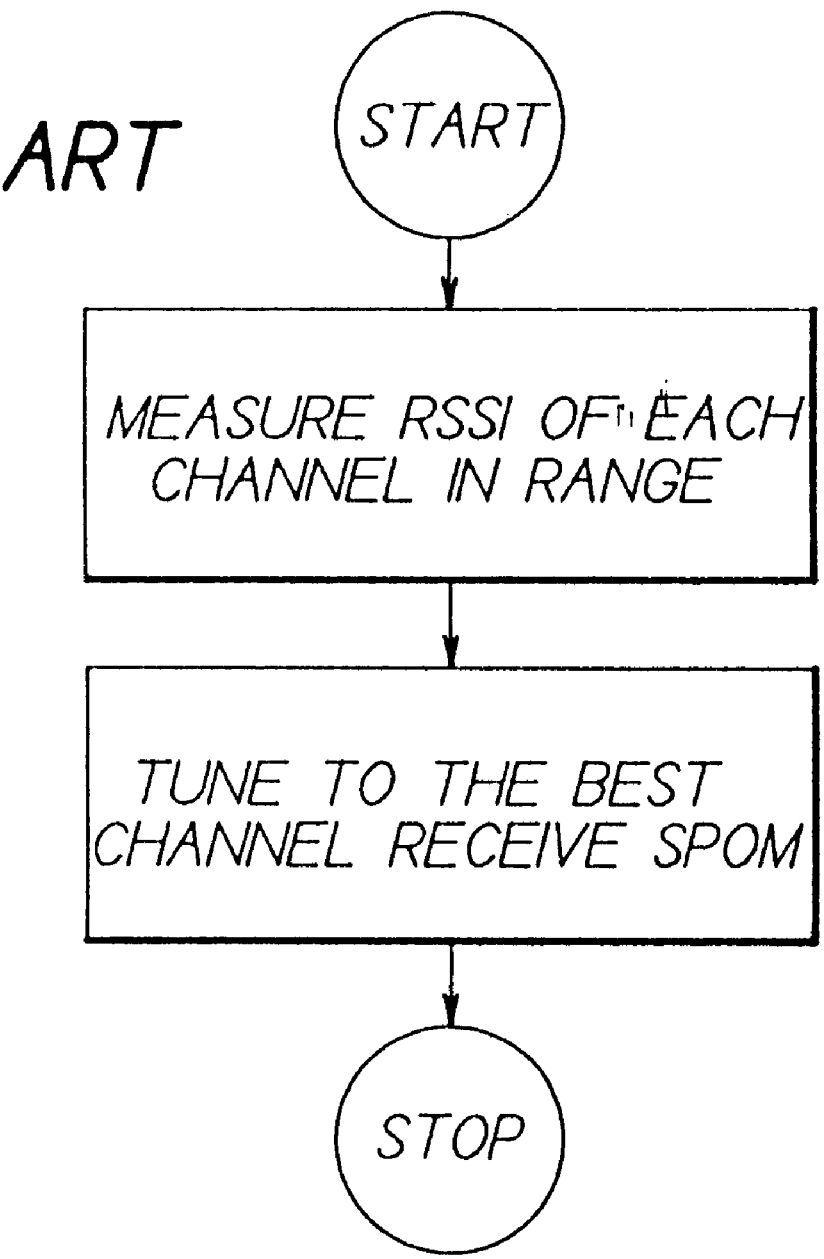
FIG. 2 is a logic flow diagram of a conventional channel selection method (access channel)

Reference is made to FIG. 3 for illustrating a mobile station 10 that is suitable for practicing this invention. The mobile station 10 includes an antenna 12 for transmitting signals to and for receiving signals from a cell site or base station (not shown) of one of the cells illustrated in FIG. 1. To this end the mobile station includes a transmitter 14, a receiver 16, and a controller 18 that provides signals to and receives signals from the transmitter 14 and receiver 16, respectively. These signals include signalling information in accordance with the air interface of the cellular system (e.g., EIA/TIA-553 or IS91), and also user speech and/or user generated data.

Figure 5A:
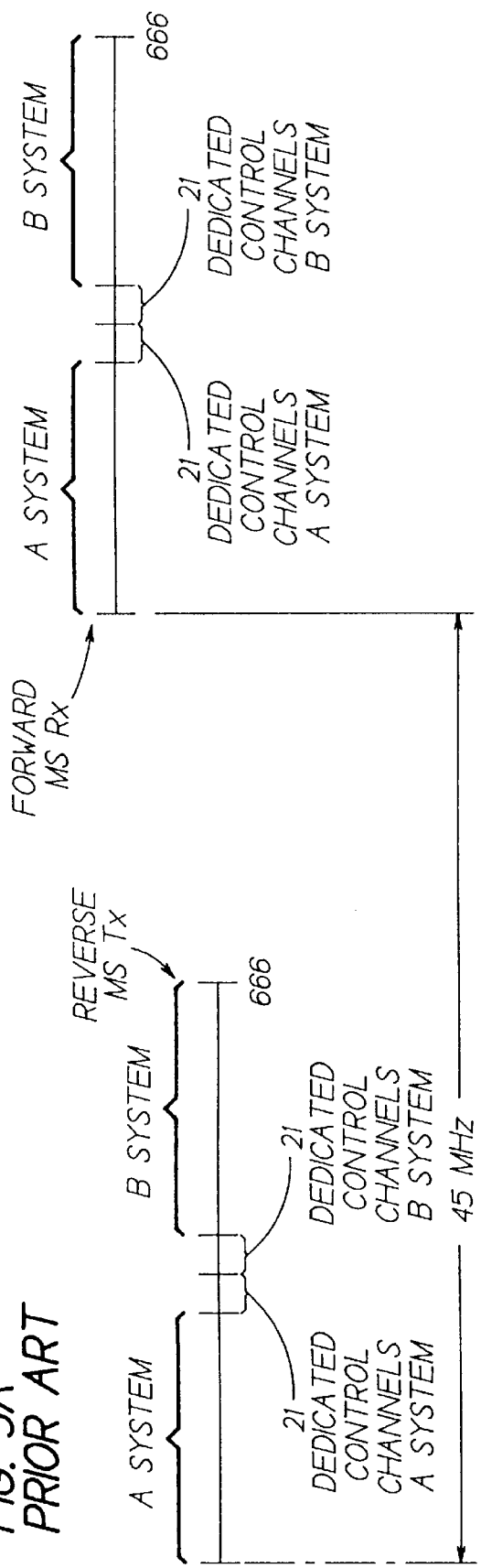
FIGS. 5A and 5B illustrate various conventional mobile station forward and reverse frequency bands and associated control, paging, and access channels, and are useful in understanding the teaching of this invention.

A user interface includes a conventional earphone 17, a conventional microphone 19, a display 20, and a user input device, typically a keypad 22, all of which are coupled to the controller 18. The mobile station 10 also includes a memory 24 wherein is stored a plurality of constants and variables that are used by the controller 18 during the operation of the mobile station. For example, the memory 24 includes at least one NAM and stores the value of one or more SIDs, including the mobile station's home SID. An operating program for controlling the operation of controller 18 is typically stored in a separate program memory (not shown). The controller 18 outputs a signal (TUNE) 18a to the transmitter 12 and the receiver 16 that is used for varying the transmit and receive frequencies, thereby enabling the mobile station to tune to various control and voice channels. When tuning to a desired channel the transmitter 14 and receiver 16 will normally be tuned so as to be separated by 45 MHz (see, for example, FIG. 5A). A received signal strength indicator (RSSI) is provided from the receiver 16, and is useful in determining a strength of a received signal from, for example, a dedicated control channel and/or a paging channel.

It should be understood that the mobile station 10 can be a vehicle mounted or a handheld device. It should further be appreciated that the mobile station 10 can be capable of operating with two or more air interface standards, modulation types, and access types. By example, the mobile station may be capable of operating in accordance with a frequency modulated (FM), frequency division multiple access (FDMA) transmission and reception standard, such as is found in conventional 800 MHz public cellular systems (e.g., EIA/TIA-553), and improvements and modifications thereof. For a dual mode mobile station, operation may also occur as well, when operating on an analog control channel, with a phase modulated (PM), time division multiple access (TDMA) standard (such as EIA/TIA IS-136 or GSM), or a code division multiple access (CDMA) standard (such as EIA/TIA IS-95). Narrow-band AMPS (NAMPS), as well as TACS phones, may also benefit from the teaching of this invention.

Reference is now made to FIG. 4 for illustrating a presently preferred method of this invention. At Block A the mobile station 10 scans the set of control channels in accordance with, by example, the Scan Dedicated Control Channels task (e.g., EIA/TIA-553, Sec. 2.6.1.1.1). At Block B the mobile station 10 tunes to the control channel having the highest signal strength, enters the Update Overhead Information task and receives, within three seconds, a System Parameter Message (e.g., EIA/TIA-553, Sec. 2.6.1.2). See also Sec. 3.7.1.2.1, System Parameter Overhead Message (SPOM). The mobile station 10 stores the SID from the SPOM in the memory 24. Block A may be entered upon one of a power-on condition being sensed by the controller 18, or upon an expiration of a re-scan timer (RST) 18b, or upon a call origination.

Figure 5B:
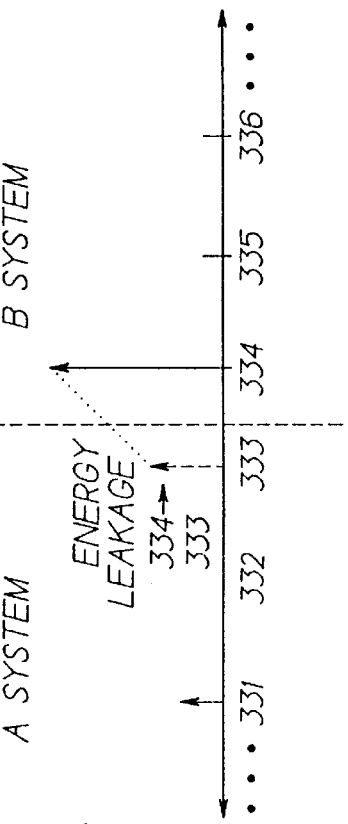

In accordance with this invention, at Block C the mobile station 10 compares the number of the strongest channel to determine if it is one of the system boundary channels (i.e., 333 or 334). If NO, the mobile station 10 proceeds as in a normal fashion to Block D, where the control channel that is used is equal to the strongest control channel, performs paging channel selection (e.g., EIA/TIA-553, Sec. 2.6.1.2), and eventually enters the Idle task to monitor the paging channel. If YES at Block C, i.e., the number of the strongest control channel is 333 (or 334), the mobile station 10 tunes also to the second best channel (e.g., channel 331 as in the case of FIG. 5B) at Block E, receives the SPOM from the second best channel, and stores the received SID. At Block F the mobile station 10 compares the stored SID from the best (boundary) channel to the stored SID for the second best channel. If the SIDs are equal (i.e., both were received from the same system, either System A or System B), control passes to Block D and the mobile station 10 re-tunes to the strongest control channel and uses the strongest control channel.

However, if the SIDs are not equal it is indicated that the strongest boundary channel is not valid for the current serving system. The mobile station 10 then selects, at Block G, the second best channel (e.g., 331) as the valid channel and thus locks onto correct serving system before performing paging channel selection (e.g., EIA/TIA-553, Sec. 2.6.1.2), and eventually entering the Idle task.

This method can be used in all channel scanning processes: dedicated control channel scan, paging channel scan, and access channel scan. It can be used for paging and access channels if these channels are located physically in the same band as the dedicated control channels, which is usually the case.

It should be noted that if the mobile station 10 is operating in the border of two similar systems (for example two A System), and if other system is using channel 333, then the mobile station will always reject channel 333.

Although described in the context of control and paging channels, it should be realized that the term "control channel" should be broadly read to include any channel on which the mobile station 10 may receive control information and messages from the base station, and the term "paging channel" should be broadly read to include any channel on which pages are sent to the mobile station.

The invention has been described above primarily in the context of dedicated control channels. However, in general reaching the Idle state is a two step process. The first step locks onto a dedicated control channel and receives information required to determine the paging channel set and the System ID. The second step scans the paging channels and selects the strongest (or second strongest) paging channel. The mobile station 10 can enter the Idle state only after receiving the SPOM and updating necessary information on the paging channel.

As such, it should be realized that the teaching of this invention applies to both cases: i.e., selecting a dedicated control channel and also selecting a paging channel. That is, if the boundary channel testing is done only in the dedicated control channel task, the mobile station may never reach service if operating in a problem area, because the SID on the dedicated control channel and paging channel may not match.

The same applies when the mobile station 10 accesses the system and scans for a suitable access channel. In general, whether the mobile station 10 is required to receive the SPOM on the access channel depends on information received on the paging channel (RCF bit) and access channel (WFOM bit). In practice the mobile station 10 is required to rarely receive the SPOM (and SID) in the system access task.

In accordance with this invention the SIDs may also always be checked during system access, if the strongest channel is a boundary channel.

The teaching of this invention should not be construed to be limited for use with only one communications standard or specification, such as EIA/TIA-553.

Thus, the invention has been particularly shown and described with respect to preferred embodiments thereof, it will be understood by those skilled in the art that changes in form and details may be made therein without departing from the scope and spirit of the invention.

What is claimed is:

1. A method for operating a mobile station to obtain service from a cellular system, comprising the steps of:

scanning a set of control channels and tuning to the strongest control channel;

receiving a first message from the strongest control channel and storing a first system identifier from the first message;

determining if the channel number of the strongest control channel is equal to a system boundary channel number; and if yes, tuning to a second strongest control channel;

receiving a second message from the second strongest control channel and storing a second system identifier from the second message; and comparing the first system identifier to the second system identifier and if they are not equal, remaining tuned to the second strongest control channel.

2. A method as set forth in claim 1, and further comprising a step of entering an Idle task and receiving paging messages.

3. A method as set forth in claim 1, wherein if in comparing the first system identifier to the second system identifier it is found that they are equal, the method includes a step of retuning to the strongest control channel.

4. A method for operating a mobile station to obtain service from a cellular system, comprising the steps of:

executing a Scan Dedicated Control Channels task and tuning to a strongest dedicated control channel;

receiving a first System Parameter Overhead Message (SPOM) from the dedicated control channel;

storing a first System Identification (SID) from the first SPOM;

determining if the channel number of the strongest dedicated control channel is equal to a system boundary channel number; and if yes, tuning to a second strongest dedicated control channel;

receiving a second SPOM from the second strongest dedicated control channel and storing a second SID from the second SPOM; and comparing the first SID to the second SID and if they are not equal, entering an IDLE task while remaining tuned to the second strongest dedicated control channel, else if the first SID is equal to the second SID, re-tuning to the strongest dedicated control channel and entering the IDLE task while remaining tuned to the strongest dedicated control channel.

5. A mobile station comprising a transmitter, a receiver, a controller coupled to said receiver and to said transmitter, and a memory, said mobile station controller being responsive to one of a power-on condition, an expiration of a re-scan timer, or a call origination for scanning a set of frequency channels and for tuning to a strongest frequency channel, said mobile station controller further comprising means: for receiving a message from the strongest frequency channel; for storing in said memory a first system identifier from the message; for determining if the channel number of the strongest frequency channel is equal to a system boundary channel number; and if yes, for tuning to a second strongest channel; for receiving a further message from the second strongest frequency channel and storing in said memory a second system identifier from the further message; for comparing the first system identifier to the second system identifier and if they are not equal; for remaining tuned to the second strongest frequency channel; wherein the set of frequency channels are at least one of a set of dedicated control channels, a set of paging channels, and a set of access channels.

6. A mobile station comprising a transmitter, a receiver, a controller coupled to said receiver and to said transmitter, and a memory, said mobile station controller being responsive to one of a power-on condition, an expiration of a re-scan timer, or a call origination for scanning a set of frequency channels and for tuning to a strongest frequency channel, said mobile station controller as described in claim 5, further comprising means for tuning to the strongest frequency channel if said system identifiers are equal.

7. A method for operating a mobile station to obtain service from a cellular system, comprising the steps of:

scanning frequency channels and tuning to a strongest channel, wherein the scanned frequency channels are at least one of a set of dedicated control channels, a set of paging channels, and a set of access channels;

receiving a message from the strongest channel and storing a first system identifier from the message;

determining if the channel number of the strongest channel is equal to a system boundary channel number; and if yes, tuning to a second strongest channel;

receiving a further message from the second strongest channel and storing a second system identifier from the further message; and comparing the first system identifier to the second system identifier and, if they are not equal, remaining tuned to the second strongest channel, else if they are equal retuning to the strongest channel.

* * * * *